United States Patent [19]

Koshibe et al.

[11] 4,297,473

[45] Oct. 27, 1981

[54] QUICK-CURING PHENOLIC RESIN AND PROCESS FOR PREPARING SAME

[75] Inventors: Shigeru Koshibe, Toride; Motoyuki Nanjo, Yokohama, both of Japan

[73] Assignee: Sumitomo Bakelite Company Limited, Tokyo, Japan

[21] Appl. No.: 148,104

[22] Filed: May 9, 1980

[30] Foreign Application Priority Data

May 21, 1979 [JP] Japan .................. 54-61478

[51] Int. Cl.$^3$ .............................................. C08G 8/10
[52] U.S. Cl. ................................... 528/144; 525/481; 528/165
[58] Field of Search ............... 528/144, 165, 139, 140

[56] References Cited

U.S. PATENT DOCUMENTS

| | | | |
|---|---|---|---|
| 1,737,917 | 12/1929 | Cherry | 528/144 |
| 2,040,207 | 5/1938 | Kraus | 528/144 X |
| 2,167,094 | 7/1939 | Turkington et al. | 528/144 X |
| 2,330,217 | 9/1943 | Hunn | 528/144 X |
| 2,385,372 | 9/1945 | Rhodes | 528/144 X |
| 2,463,501 | 3/1949 | Arvin | 528/144 X |
| 2,475,587 | 7/1949 | Bender | 528/165 X |
| 2,934,511 | 4/1960 | Auerbach et al. | 528/144 X |
| 3,005,797 | 10/1961 | Larkin et al. | 528/144 X |
| 3,106,547 | 10/1963 | McTaggart et al. | 528/144 |
| 3,133,034 | 5/1964 | St. Clair et al. | 528/144 X |
| 3,242,118 | 3/1966 | St. Clair et al. | 528/144 X |
| 3,308,096 | 3/1967 | Ivanov et al. | 528/144 |
| 3,332,911 | 7/1967 | Huck | 528/139 X |
| 3,476,707 | 11/1969 | Culbertson et al. | 528/139 |
| 3,538,051 | 11/1970 | Higginbottom | 528/144 X |
| 3,687,896 | 8/1972 | Vargiu et al. | 528/144 X |
| 3,870,682 | 3/1975 | Endres et al. | 528/144 X |
| 3,988,386 | 10/1976 | Hesse et al. | 528/144 X |
| 4,020,048 | 4/1977 | Harrop | 528/144 |
| 4,097,463 | 6/1978 | Culbertson | 528/140 X |
| 4,113,700 | 9/1978 | Culbertson | 528/165 X |

Primary Examiner—Howard E. Schain

[57] ABSTRACT

Disclosed herein is a novel high-ortho phenolic novolac resin having excellent quick-curing property and thermal stability for use as phenolic resin molding material and perfectly free of divalent metal salt which is detrimental to the electrical properties of the molding material. This resin can be obtained by condensing a phenol and an aldehyde in an aldehyde/phenol molar ratio ranging from 0.6 to 1.0 and at a reaction temperature of more than 100° C. at which the selectivity for condensation at the para-position is lowered (that is, the probability of the condensation at the ortho-position increases), with a weakly acidic catalyst having a specified dissociation constant (pKa value). The high-ortho phenolic novolac resin (having the specific molecular weight and ortho/para linkage ratio) obtained from said reaction is very useful for industrial applications as a phenolic injection molding material or epoxy/phenolic low-pressure encapsulation molding material with excellent electrical properties.

5 Claims, No Drawings

QUICK-CURING PHENOLIC RESIN AND PROCESS FOR PREPARING SAME

This invention relates to a quick-curing phenolic resin which is free from divalent metal salt and a process for producing said resin, and more particularly it relates to a process for producing a high-ortho phenolic resin by reacting a phenol and an aldehyde in a specified ratio at a specified temperature without using any divalent metal salt but by using a weak acid as catalyst, and to the high-ortho phenolic novolac resin obtained by said process.

Since H. L. Bender et al reported that a phenolic resin with a high ortho-linkage content can be produced by using a divalent metallic salt as catalyst and that such high-ortho phenolic resin has a quick-curing property, various processes for producing such a high-ortho phenolic resin have been devised. According to any of these conventional techniques, a divalent metal salt is always used in some form, and it has been considered that production of high-ortho phenolic resin by use of an acid catalyst alone is impossible or industrially inexpedient. It is well known that divalent metal salts have ortho orientation, but the studies of the present inventors revealed that, in the reactions between phenols and formaldehyde, the ortho orientation appears at the time of an addition reaction, and that when the condensation reaction is performed at a temperature of 100° C. or less, said reaction advances under the preponderance of para-position even in the presence of a divalent metal salt, and consequently, a phenolic resin with a low ortho content is produced. It has thus been clarified that one of the essential conditions for obtaining a high-ortho phenolic resin with a high ortho content is that the condensation reaction is carried out at a temperature of more than 100° C. at which the para selectivity is reduced. This is attributable to the fact that the kinetic energy of each molecule increases as the temperature rises, and hence the energy barrier at the ortho-position due to steric hindrance of the hydroxyl group is relatively reduced to an ignorable extent, causing a corresponding increase of the probability of the reaction at the ortho-position.

When a strong acid catalyst such as hydrochloric acid is used a high-para novolac is obtained. This is because para-condensation takes place preferentially as the reaction proceeds with a strong acid having a pKa value of not more than 1. The present inventors have found that ortho selectivity in the condensation stage increases when a weak acid having a pKa value of more than 1 is used as acid catalyst. It has thus been found that when pKa≦1, the condensation reaction rate elevates and said reaction advances at a low temperature, so that the ortho-position energy barrier due to steric hindrance of the hydroxyl group dominates the reaction, giving rise to selective condensation at the para-position, and that when pKa>1, it becomes possible to effect the reaction at a high temperature of more than 100° C. owing to a low condensation reaction rate, resulting in an increased probability of ortho condensation.

As a result of further studies on the said reaction in the light of these facts, the present inventors have found that high-ortho phenolic resin can be produced industrially with no need of using a divalent metal salt as catalyst by carrying out the reaction with a weak acid at a temperature of more than 100° C. at which there occurs not much difference in reaction rate between the ortho-position and the para-position of the phenol nucleus and the para orientation is weakened to give rise of ortho selectivity.

According to this invention, there is provided a quick-curing phenolic resin in which the ortho linkage to para linkage ratio is within the range of from 0.85 to 2.5 and the number-average molecular weight of the resin exclusive of free phenols is within the range of from 500 to 1,200 and which is free of divalent metal salt.

According to this invention, such a quick-curing phenolic resin can be produced by a method comprising reacting a phenol (P) such as phenol; an alkylphenol, for example, cresol, xylenol, or the like; resorcinol; or the like, and an aldehyde (F), such as formaldehyde; a monoaldehyde, for example, acetaldehyde, or the like in a F/P molar ratio of 0.6 to 1.0 at a temperature of more than 100° C. under normal pressure or under pressure with a weak acid catalyst.

The phenolic resin produced according to the process of this invention is of the type in which the ortho linkage to para linkage ratio (hereinafter referred to as o/p ratio) is within the range of from 0.85 to 2.5, and the number-average molecular weight of the resin exclusive of free phenols (hereinafter expressed as $\overline{M}n$) is 500 to 1,200. For use as molding material, it is desirable that the o/p ratio is 1.0 to 1.5 and $\overline{M}n$ is 700 to 900.

The weak acids usable as catalyst in this invention are those having a pKa value of more than 1 but less than 10 such as, for example, formic acid, acetic acid, oxalic acid, malonic acid, succinic acid, tartaric acid, citric acid, benzoic acid, salicylic acid, phthalic acid, fumaric acid and the like, and at least one of these acids is used for said purpose. The higher the pKa value of the acid used, the higher the ortho linkage content of the obtained phenolic resin, but actually an acid having a pKa value of than 10 is not desirable because of poor reactivity of the reaction system. The amount of the weak acid used is preferably $8 \times 10^{-4}$ to 0.1 mole of acid per mole of the phenol charged. When the amount is less than $8 \times 10^{-4}$ mole, the reaction rate is too low to use the process in industry. When the amount is more than 0.1 mole, the reaction rate is not increased and hence such as amount of weak acid is not economical.

The aldehyde used in this invention is preferably formaldehyde, and such formaldehyde is used in the form of formalin or para-formaldehyde. As it is essential to carry out the reaction at a temperature of more than 100° C. at which para selectivity is weakened, it is necessary to keep the system under pressure in the case of using formalin. For instance, when 37% formalin is used and F/P ratio is 0.80, application of pressure of about 2 atm. is required.

The phenolic resin obtained according to the process of this invention has a higher range of o/p ratio than that (0.7-0.8) of ordinary high-para novolac and has excellent quick curing characteristics. Therefore, when this resin is used as molding material, it shows quick curability, and also, as it contains no divalent metal salt, it can be used for the applications where the absence of impurities is required. Because of absence of any divalent metal salt, the resin has good electrical properties, and further, in the case of using a high-temperature decomposed type of acid such as formic acid or malonic acid, the ionic substance in the resin is drastically reduced to provide a molding material with splendid electrical properties.

Further, since the amount of the residual acid catalyst is small the thermal stability of the injection molding material in the cylinder is enhanced. Also, since the molding material obtained from the resin of this invention is low in ash content, the wear of the injection cylinder nozzle or die gate is minimized. Moreover, by utilizing as epoxy curing agent the phenolic resin of this invention which contains impurities only in a small amount to provide excellent electrical properties and which may have various o/p ratios, there is provided a high-quality encapsulation molding material for which delicate moldability, heat resistance, moisture resistance, electrical properties, etc., are required.

The invention is now described in further detail referring to Examples and Comparative Examples, but the invention is not limited to these Examples. In the following Examples and Comparative Examples, all the "parts" and "%" are by weight unless otherwise specified. The o/p ratio, number-average molecular weight and curability were determined in the following way.

O/p ratio: The amount of methylene protons was measured by a nuclear magnetic resonance (NMR) method, and the o/p ratio was calculated from the following equation:

$$o/p \text{ ratio} = \frac{\text{ortho-ortho linkage methylene protons} + \frac{1}{2} \text{ortho-para linkage methylene protons}}{\text{para-para linkage methylene protons} + \frac{1}{2} \text{ortho-para linkage methylene protons}}$$

Number-average molecular weight: The number-average molecular weight was first determined by a vapour pressure equilibrium method and then this was corrected by the value for free phenols obtained by gas chromatography to determine the number-average molecular weight of the resin exclusive of free phenols.

Curability:
Measuring apparatus used: JSR Curelastometer (shown in U.S. Pat. No. 3,479,858 and British Pat. No. 1,126,995)
Measuring conditions:
Molding pressure: 100 kg/cm²
Angle of oscillation: 0.5°
Die temperature: 150° C.
(Gel time was measured at 120° C.)

EXAMPLE 1

With 300 g of phenol was reacted 92.5 g of 88% paraformaldehyde (F/P=0.85) under refluxing for 4 hours in the presence of 0.4 g of oxalic acid (the internal temperature varying from 120° C. to 105° C.), and the reaction product was dehydrated under normal pressure for 3 hours and taken out when the internal temperature had reached 160° C. There was obtained 306 g of a phenolic resin containing 6.8% of free phenols and having an o/p ratio of 0.9 and $\overline{M}n$ of 900. To 100 parts of this resin was added 15 parts of hexamethylenetetramine, and the gel time (hereinafter referred to as GT) of the mixture was measured on a hot plate at 150° C. It was 65 seconds.

COMPARATIVE EXAMPLE 1

With 300 g of phenol was reacted 220 g of 37% formalin (F/P=0.85) under refluxing for 4 hours in the presence of 0.4 g of oxalic acid (internal temperature: 98° C.), and the reaction product was dehydrated in the same way as in Example 1 to obtain 302 g of a phenolic resin containing 7.2% of free phenols and having an o/p ratio of 0.75 and $\overline{M}n$ of 900. This resin was an ordinary high-para novolac phenolic resin and its GT on a hot plate was 86 seconds, which is longer than that of the resin of Example 1.

COMPARATIVE EXAMPLE 2

With 300 g of phenol was reacted 92.5 g of 88% paraformaldehyde (F/P=0.85) under the same conditions as in Example 1 in the presence of 0.4 g of 30% hydrochloric acid, and the reaction product was dehydrated in the same way as in Example 1 to obtain 307 g of a phenolic resin. This resin was a high-para novolac phenolic resin containing 6.5% of free phenols and having an o/p ratio of 0.7 and $\overline{M}n$ of 900. The internal temperature during refluxing varied from 120° C. to 100° C.

EXAMPLE 2

With 300 g of phenol was reacted 217 g of 37% formalin (F/P=0.84) for 5 hours in the sealed state in the presence of 7.5 g of formic acid, which is a high-temperature decomposed type catalyst, while maintaining the internal temperature at 125° C. The reaction product was brought back to normal pressure and then dehydrated in the same way as in Example 1 to obtain 304 g of a phenolic resin containing 5.2% of free phenols and having an o/p ratio of 1.3, $\overline{M}n$ of 850 and GT of 59 seconds. This resin was mixed with hexamethylenetetramine, wood flour, stearic acid, etc., and kneaded by 120° C. hot rolls for 3 minutes to obtain a molding material. The molded product obtained from this material had an insulation resistance of $2.0 \times 10^{10} \Omega$ in the normal state and $8.4 \times 10^9 \Omega$ after a boiling treatment.

COMPARATIVE EXAMPLE 3

A conventional quick-curing phenolic resin (free phenol content=5.5%, o/p ratio=1.3, $\overline{M}n$=850) produced by using hydrochloric acid and zinc acetate (a divalent metal salt) as catalyst was prepared into a molding material and molded under the same conditions as in Example 2. The molded product had an insulation resistance of $1.2 \times 10^9 \Omega$ in the normal state and $2.3 \times 10^8 \Omega$ after a boiling treatment. The electrical properties of this product were far inferior to those of the product of Example 2.

EXAMPLE 3

With 300 g of phenol was reacted 92.5 g of 88% paraformaldehyde (F/P=0.85) under refluxing in the presence of 4 g of malonic acid (a high-temperature decomposed type catalyst) for 3 hours (internal temperature: 120° C.), and the reaction product was treated in the same way as in Example 1 to obtain 300 g of a phenolic resin containing 5.8% of free phenols and having an o/p ratio of 1.8 and $\overline{M}n$ of 850. This resin was mixed with hexamethylenetetramine and its curability was measured by using a Curelastometer. The gel time was 3 min. and 39 sec., the maximum degree of cure was 9.2 kg and the curing rate was 8.0 kg/min. This resin was further treated to obtain a molding material in the same manner as in Example 2 and its moldability was examined by using a small-sized injection machine. This molding material showed the possible residence time in cylinder of 180 seconds and was capable of continuous molding.

COMPARATIVE EXAMPLE 4

A conventional type quick-curing phenolic resin (free phenol content=6.2%, o/p ratio=1.8, $\overline{M}n$=850) was prepared by using salicylic acid and zinc acetate which is a divalent metal salt, and the curability of this resin was measured by using a Curelastometer under the same conditions as in Example 3. As a result, the gel time was 2 min. and 48 sec., the maximum degree of cure was 8.9 kg and the curing rate was 8.2 kg/min. The curing rate is equal to that of the product of Example 3 but the gel time is shorter. An examination of the moldability conducted in the same way as in Example 3 showed that the possible residence time in cylinder was 60 seconds, far shorter than the product of Example 3, and the molding material was incapable of continuous molding. The difference from Example 3 is that a divalent metal salt is contained in the resin and this impairs thermal stability in the cylinder.

EXAMPLE 4

With 300 g of phenol was reacted 97.9 g of 88% paraformaldehyde (F/P=0.9) in the saled state in the presence of 5 g of succinic acid for 5 hours (internal temperature: 130° C.), and the reaction product was brought back to normal pressure and resinified by raising the internal temperature stepwise to 160° C. over 4 hours, whereby 302 g of resin containing 7.3% of free phenols and having an o/p ratio of 2.3, $\overline{M}n$ of 900 and GT of 30 sec. was obtained.

EXAMPLE 5

The resin of Example 2 with few catalyst residue was mixed with an epoxy resin, a flame retardant, a curing assistant, a coupling agent, a filler, and a releasing agent, and the mixture was kneaded by hot rolls at 100° C. for 10 minutes to obtain an epoxy encapsulating material. The molded product obtained from this material had a volume resistivity of $6.2 \times 10^{16} \Omega$ in the normal state and $8.7 \times 10^{15} \Omega$ after a boiling treatment. The GT on a hot plate was 80 seconds.

COMPARATIVE EXAMPLE 5

The conventional type high-ortho novolac phenolic resin of Comparative Example 3 was formulated into a molding material and a molded product therefrom was evaluated in the same manner as in Example 5. It showed a volume resistivity of $9.1 \times 10^{14} \Omega$ in the normal state and $2.4 \times 10^{12} \Omega$ after a boiling treatment, both of which were far inferior to those of the product of Example 5.

The high-para novolac phenolic resin of Comparative Example 2 was washed with water to remove the remaining free phenols and catalyst and then subjected to the same treatment and evaluation as mentioned above. The volume resistivity of the molded product from this resin was $8.8 \times 10^{14} \Omega$ in the normal state and $2.1 \times 10^{12} \Omega$ after a boiling treatment, and the GT on a hot plate was 60 seconds. The electrical properties were still inferior to those of the product of Example 5 although the resin was subjected to a washing treatment. Thus, the use of the novolac phenolic resin of this invention as curing agent makes it possible to obtain an epoxy encapsulating material having far better electrical properties than the conventional novolac phenolic resins with no need of performing any specific washing treatment.

COMPARATIVE EXAMPLE 6

With 300 g of phenol was reacted 114 g of 88% paraformaldehyde (F/P=1.05) in the same way as in Example 4 in the presence of 5 g of succinic acid. As the reaction became violent when the internal temperature reached 145° C., the reaction product was rapidly taken out on a vat. This resin showed the following properties: free phenol content=9.0%; o/p ratio=2.7; $\overline{M}n$=1,250; but it had almost no fluidity. Production on an industrial scale is impossible because of danger involved in said production. Generally, production of phenolic resins with an o/p ratio>2.5 and/or $\overline{M}n$>1,200 is accompanied by the risk of gelation and hardly carried out industrially.

COMPARATIVE EXAMPLE 7

When 300 g of phenol and 60 g of 88% paraformaldehyde (F/P=0.55) were reacted in the same way as in Example 1 in the presence of 0.4 g of oxalic acid, there was obtained 254 g of phenolic resin containing 10.5% of free phenols and having an o/p ratio of 0.85 and $\overline{M}n$ of 450. This resin is not only poor in yield but is also difficult to handle because of its half-solid state and hence not suited for industrial applications.

What is claimed is:

1. A process for producing a quick-curing phenolic resin having an ortho linkage to para linkage ratio ranging from 0.85 to 2.5 and a number-average molecular weight of the resin exclusive of free phenol of 500 to 1,200, which comprises reacting phenol (P) with formaldehyde (F) in a F/P molar ratio ranging from 0.6 to 1.0 using only as a catalyst at least one acid selected from the group consisting of formic acid, oxalic acid, malonic acid, and succinic acid, said reaction being effected at a temperature of 105°–130° in at least the first stage for 3–5 hours.

2. A process according to claim 1, wherein the formaldehyde is in the form of formalin or paraformaldehyde.

3. A process according to claim 1, wherein the formaldehyde is in the form of formalin and the reaction is effected under pressure.

4. A process according to claim 1, wherein the formaldehyde is in the form of paraformaldehyde, and the reaction is effected under normal pressure.

5. A process according to claim 1, wherein said acid catalyst is formic acid or malonic acid.

* * * * *